John T. Patton
Gordon P. Lindblom  Inventors

By James E. Reed  Attorney

John T. Patton
Gordon P. Lindblom  Inventors

United States Patent Office 3,020,206
Patented Feb. 6, 1962

3,020,206
PROCESS FOR SYNTHESIZING POLY-
SACCHARIDES
John T. Patton and Gordon P. Lindblom, Tulsa, Okla.,
assignors to Jersey Production Research Company, a
corporation of Delaware
Filed May 23, 1960, Ser. No. 31,187
13 Claims. (Cl. 195—31)

The present invention relates to methods for the biochemical synthesis of polysaccharides and more particularly relates to an improved process for the production of a heteropolysaccharide by the action of bacteria of the genus Xanthomonas on carbohydrates. In still greater particularity, the invention relates to a process for the fermentation of carbohydrates by Xanthomonas organisms under controlled conditions which result in considerably higher heteropolysaccharide yields than have been obtained in the past.

Considerable interest in polysaccharides produced by the bacterial fermentation of carbohydrates has been exhibited in recent years. Impetus has been given to the development of this interest by the discovery that certain polysaccharides formed by biochemical synthesis have properties which permit their use as thickening agents for water used in secondary recovery operations carried out in the petroleum industry. It has been found that some of these materials added to water or brine in suitable concentrations produce viscous solutions which are relatively stable under the conditions which prevail in subsurface oil reservoirs. By utilizing a solution of controlled viscosity in place of the water or brine normally employed in waterflooding projects, a favorable mobility ratio between the oil in the reservoir and the liquid used to displace it can be obtained. The tendency of the displacing medium to finger through highly permeable sections of the reservoir without displacing oil from the less permeable sections is greatly decreased. Viscous forces which normally reduce the displacement efficiency in portions of the reservoir through which the displacing medium actually passes are more readily overcome. As a result of these effects, the use of water or brine containing polysaccharide thickening agents generally permits the recovery of significantly greater quantities of oil during waterflooding than can be recovered with water or brine alone.

A particularly effective polysaccharide for use as a thickening agent during oil field waterflooding operations is the heteropolysaccharide produced by the action of bacteria of the genus Xanthomonas upon sugar, starches and similar carbohydrates. Studies and comparative tests have shown that this material, a polymer containing mannose, glucose, glucuronic acid salts, and acetyl radicals in a molar ratio of about 2:1:1:1 respectively, has much greater thickening power than dextran and similar polysaccharides and hence can be used in significantly lower concentrations than the other materials. It is effective in both fresh water and brine and has excellent high temperature stability characteristics. It is not precipitated or adsorbed to a significant extent upon contact with porous rock and sands commonly found in oil-bearing reservoirs. It exhibits little or no tendency to plug unconsolidated sand reservoirs operations. The combination of all of these properties makes the heteropolymer formed by Xanthomonas organisms from carbohydrates considerably more attractive than other polysaccharides for use as water thickeners in secondary recovery operations.

The heteropolysaccharide described above is normally produced by inoculating a medium containing from about 1 to about 5 percent by weight of a suitable carbohydrate, organic nitrogen sources, dipotassium hydrogen phosphate and appropriate trace elements with an organism of the genus Xanthomonas and then permitting the culture to incubate at about room temperature and under aerobic conditions for a period of about three days. Carbohydrates which may be employed in this manner include glucose, fructose, maltose, sucrose, lactose, galactose, soluble starch, corn starch and the like. Specific Xanthomonas organisms which may be used to produce heteropolysaccharides include *Xanthomonas campestris, Xanthomonas phaseoli, Xanthomonas malvacearum, Xanthomonas translucens, Xanthomonas carotae, Xanthomonas hederae, Xanthomonas papavericola, Xanthomonas begoniae, Xanthomonas incanae, Xanthomonas vasculorum* and *Xanthomonas vesicatoria*. At the end of the incubation period, the crude polymer formed in the culture medium can be separated from the bacterial cells by centrifugation or filtration and can thereafter be isolated and purified by precipitating it with methanol, ethanol, acetone or a similar reagent. After drying, the heteropolymer is recovered as a light fluffy powder which may be slightly tinted by colored materials from the culture medium.

Experience has shown that the fermentation reaction by means of which bacteria of the genus Xanthomonas act to produce the heteropolysaccharide normally stops far short of completion and that consequently only a small part of the carbohydrate initially present in the culture medium is utilized by the bacteria. This constitutes a serious drawback to the production of the heteropolysaccharide in large quantities because it necessitates that the carbohydrate be used in much larger amounts than would otherwise be necessary. The unreacted culture medium must be separated from the heteropolymer at the conclusion of the fermentation step and, if it is to be reused, must be reconstituted and returned to the fermentation vessel. The total cost of the heteropolymer produced in this manner is somewhat higher than it would be if the carbohydrate initially present in the culture medium could be more effectively utilized.

The present invention provides a new and improved process for synthesizing the heteropolysaccharide. In accordance with the invention, it has now been found that the fermentation of carbohydrates by bacteria of the genus Xanthomonas to produce the heteropolysaccharide can be carried much further than it has been heretofore by carefully controlling the fermentation conditions. Experimental work has demonstrated that Xanthomonas organisms generally produce acidic products during the fermentation of carbohydrates and that the accumulation of these acid products slows down the fermentation reaction and eventually stops it short of completion. By controlling the acidity of the culture medium during fermentation so that the pH is held above 6 and preferably in excess of 6.5, it has been found that the reaction can be carried beyond the point where it normally stops and that substantially higher yields of the heteropolysaccharide than could otherwise be obtained are recovered. The process of the invention thus results in more effective utilization of the culture medium used in the fermentation process, reduces the volume of fluids which must be handled during the synthesis of a given quantity of the heteropolysaccharide, and permits an overall reduction in the cost of producing the heteropolysaccharide.

The exact nature and objects of the invention can be more fully understood by referring to the following detailed description of a preferred process embodying the invention and to the accompanying drawings which illustrate that process. In the drawings.

Figure 1:
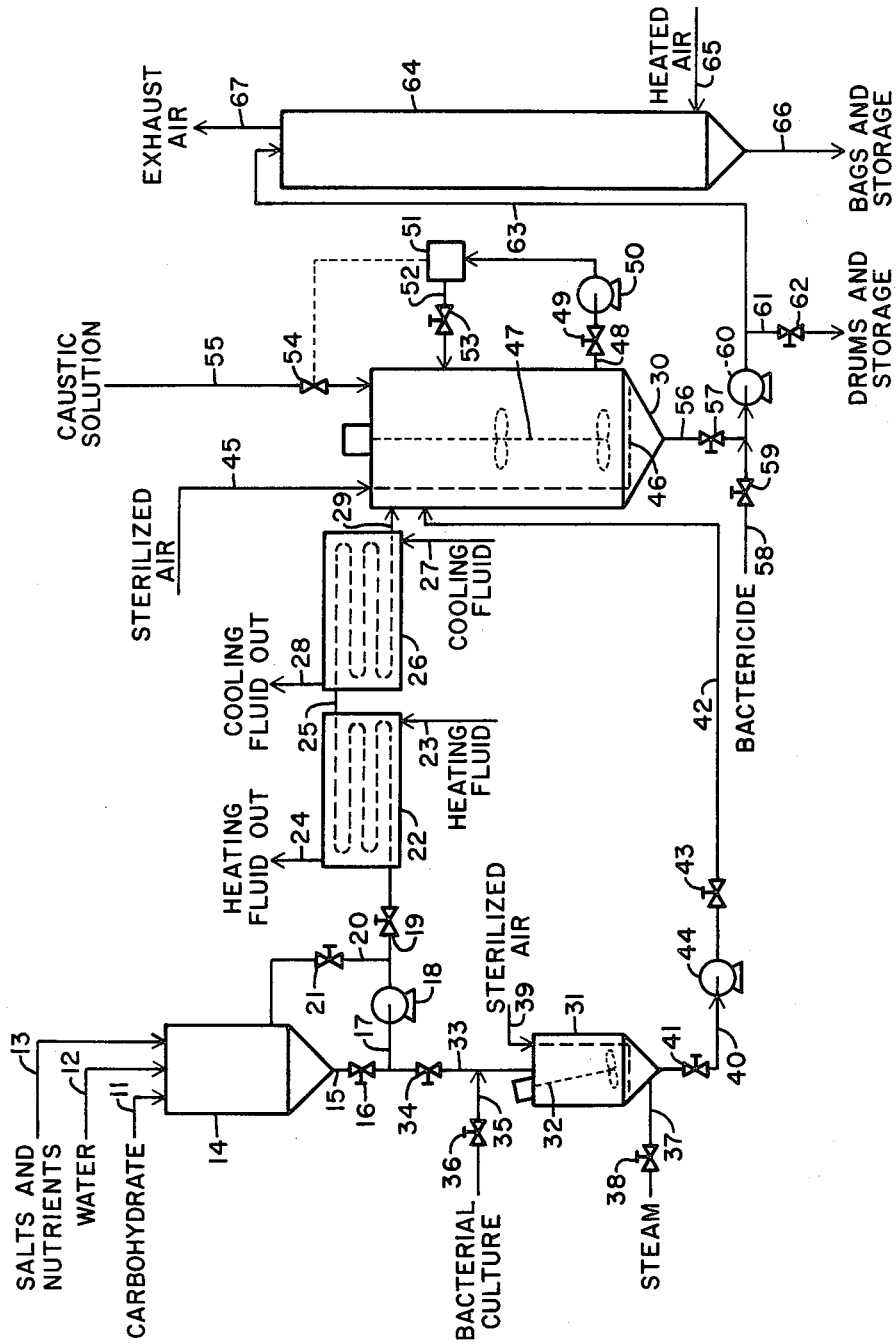
FIGURE 1 is a flow sheet representing a process for producing a heteropolysaccharide by the action of bacteria of the genus Xanthomonas upon a carbohydrate in which the pH is controlled in order to obtain increased yields.

Turning to FIGURE 1 of the drawing, the carbohydrate to be converted into heteropolysaccharides by the action of bacteria of the genus Xanthomonas in accordance with the invention is introduced into the system shown through line 11 from a suitable source. Carbohydrates which may be utilized in the process include sucrose, glucose, fructose, maltose, lactose, galactose, soluble starch, corn starch and the like. Such carbohydrates need not be in a highly refined state. In many cases, unrefined sources such as raw sugar, crude molasses and similar products high in carbohydrate content may be employed. Unrefined carbohydrate sources such as raw sugar have been found to be highly effective in the process of the invention and are normally available at low cost. They are therefore preferred. Water is introduced into the system shown in FIGURE 1 through line 12. Through line 13 are introduced salts and nutrients for supporting the bacteria utilized. The salt employed will normally comprise dipotassium acid phosphate and in some cases magnesium phosphate may also be used. Distillers' solubles such as "Stimuflav," a mixture of organic nitrogen sources and trace elements marketed by Hiram Walker & Sons, Inc., may be used as the nitrogenous nutrient. The carbohydrate, water, and the salts and nutrients are combined in feed mixing tank 14 to give a mixture containing from about 1 percent to about 5 percent by weight of the carbohydrate, from about 0.01 percent to about 0.5 percent by weight of potassium acid phosphate, and from about 0.1 percent to about 10 percent by weight of nutrients. A mixture containing about 2 percent raw sugar, about 0.1 percent potassium acid phosphate and about 0.5 percent Stimuflav has been found to give particularly good results but it will be understood that other feed materials may be most effective in slightly different concentrations.

The feed mixture thus prepared is withdrawn from mixing tank 14 through line 15 containing valve 16 and is passed through line 17, pump 18 and valve 19 into the sterilization stage of the process. A recycle line 20 containing valve 21 is provided to permit the recirculation of feed discharged by the pump into the feed tank if desired. The sterilization unit comprises a heat exchanger, a vessel containing an electrical heater, or similar apparatus 22 in which the feed mixture can be raised to a temperature of from about 200 to about 275° F. and held at that temperature for a period of from about 2 to about 5 minutes. Higher temperatures and longer residence times may be employed if desired but in general the temperatures and times indicated will be sufficient to kill any bacteria in the feed and render it sterile. As shown in FIGURE 1, the feed is passed through the tube side of a shell and tube heat exchanger and is heated by steam or other heating fluid introduced into the shell side through line 23 and subsequently withdrawn therefrom through line 24.

The sterilized feed is withdrawn from the sterilization unit at a temperature between about 200° F. and about 275° F. through line 25 and is passed into cooler 26. The cooler is depicted in FIGURE 1 as a shell and tube heat exchanger, into the shell side of which water or other cooling fluid is introduced through line 27 and from which it is subsequently withdrawn through line 28. It will be understood that a jacketed vessel or other conventional cooling apparatus may be employed in lieu of such an exchanger. The feed temperature is dropped in cooler 26 to a point between about 70° F. and about 100° F., preferably to a point between about 75° F. and about 85° F. The cooled feed mixture is then discharged through line 29 into fermenting vessel 30.

An inoculum containing bacteria of the genus Xanthomonas is introduced into the fermenting vessel 30 concurrent with the introduction of the sterile feed mixture. The inoculum may be prepared in a preparation tank 31 provided with an agitator 32. As shown in FIGURE 1, the preparation tank is connected to feed mixing tank 14 by a line 33 containing valve 34 in order to permit the transfer of feed mixture from the feed tank. Line 35 provided with valve 36 permits the addition of bacteria to the preparation tank. Xanthomonas species which may be utilized include *Xanthomonas campestris, Xanthomonas phaseoli, Xanthomonas malvacearum, Xanthomonas translucens, Xanthomonas carotae, Xanthomonas hederae, Xanthomonas papavericola, Xanthomonas begoniae, Xanthomonas incanae, Xanthomonas vasculorum* and *Xanthomonas vesicatoria. Xanthomonas campestris, Xanthomonas begoniae* and *Xanthomonas incanae* have been found to be particularly effective for purposes of the invention and are therefore preferred. The inoculum is prepared by permitting the bacteria to grow upon a small amount of feed mixture previously sterilized by bubbling steam into it through line 37 containing valve 38. Sterilized air necessary for propagation of the bacteria may be introduced into the preparation tank through line 39. Gentle agitation is provided. The rate of preparation is controlled to maintain a supply of inoculum for use in the main fermentation process. The inoculum thus prepared is withdrawn from the preparation tank through line 40 containing valve 41 and is passed through line 42 containing valve 43 into fermenting vessel 30 by means of pump 44.

The sterilized feed mixture introduced into fermenting vessel 30 is fermented by the inoculum under aerobic conditions. Sterilized air is introduced into the vessel through line 45 through a sparger, distribution plate or similar device 46 located in the lower part of the vessel. Gentle agitation is provided by propeller agitator 47. The pH of the fermenting mixture is controlled throughout the fermentation step of the process by circulating a portion of the mixture through line 48 containing valve 49 and pump 50 into pH meter 51 and returning it to vessel 30 through line 52 containing valve 53. The pH meter is electrically connected to and controls the opening of automatic valve 54 in line 55 through which sodium hydroxide or a similar basic solution is added to the fermentation vessel. Apparatus including pH electrodes immersed in tank 30 may be employed in lieu of the external meter shown in the drawing. The pH of the mixture is thus continuously held between about 6 and about 7.5, preferably between about 6.5 and about 7.2. The amount of caustic which must be added through line 55 in order to hold the pH at this level will depend upon the concentration of the caustic, the volume of fermentate and the stage of the fermentation process. Fermentation is normally carried out for a period of from 2 to 3 days or longer.

An aqueous solution of the heteropolysaccharide formed as a result of the fermentation reaction occurring within vessel 30 is withdrawn from vessel 30 through line 56 containing valve 57. The heteropolysaccharide is normally present in this solution in concentration between about 0.5 and about 3 percent by weight, producing viscosities between about 500 and about 30,000 centipoises. Hexachlorophene, formaldehyde or a similar bactericide may be added to the solution through lines 58 and valve 59 in order to kill the bacteria and preserve the polymer. In lieu of adding a bactericide, the solution may be sterilized to kill the bacteria. Circulation through pump 60 results in complete mixing of the solution and bactericide. The stabilized solution of heteropolysaccharide may be withdrawn through line 61 and valve 62 for transfer to drums or other containers if a liquid product is desired. The solution may instead be passed through line 63 and introduced into spray dryer 64 for the preparation of a solid product. In the spray dryer the solution is contacted with a rising stream of heated air introduced through line 65 and is recovered through line 66 as a soft, fluffy powder having a slight yellowish tint. Cyclones or similar separators may be used to remove any polysaccharide carried out of the dryer with the exhaust air through line 67. The powdered polysaccharide may be bagged for future use or may be further processed for the preparation of other products.

It will be understood that the process of the invention is not limited to the specific apparatus represented in FIGURE 1 of the drawing. The process depicted therein is essentially a batch-type process but can readily be converted into a continuous process by continuously adding sterile medium and withdrawing product from vessel 30. The benefits achieved by the control of pH during the fermentation of carbohydrates by bacteria of the genus Xanthomonas are not restricted to any particular type of process and may be obtained in either batch or continuous operations. It will be recognized that instrumentation, steam lines and other features conventional in a process such as that described above have not been set forth in full detail. Such features will be familiar to those skilled in the art and need not be specifically described in order to permit an understanding of the invention.

The process of the invention is further illustrated by the results obtained in tests wherein the pH of a fermenting solution containing a carbohydrate and bacteria of the genus Xanthomonas was varied to determine the effect of such variations upon the heteropolysaccharide yield obtained.

In a first test, a medium composition containing 2.0 weight percent of raw sugar, 0.1 weight percent of dipotassium acid phosphate and 0.05 weight percent of "Stimuflav," a commercial bacteria nutrient containing organic nitrogen sources and trace elements, was inoculated with *Xanthomonas campestris* bacteria and fermented under aerobic conditions at a temperature of 75° F. Determinations of the pH and viscosity of the fermentate and of the yield of heteropolysaccharide were made at intervals during the fermentation. It was found that the bacteria ceased to produce heteropolysaccharide after about 48 hours. At this point the fermentate had a viscosity of about 25.2 centipoises when tested in 1:6 dilution in distilled water with the Brookfield viscometer. The heteropolysaccharide yield at this point was 36 percent. After production of the heteropolysaccharide had ceased, the viscosity of the fermentate began to decline, apparently due to destruction of the polymer by the bacteria. After 70 hours, the viscosity had declined to about 21 centipoises and it was apparent that a further drop indicating the loss of more polymer could be expected. During this period, the pH of the fermentate declined from an initial value of 7.0 at the beginning of the fermentation to a value of about 5.4 at the end of 70 hours.

The pH of the fermentate was then raised to 7.0 by the addition of 5 normal sodium hydroxide. Following adjustment of the pH, the bacteria began to produce heteropolysaccharide again. The viscosity began to increase. Periodic measurements of fermentate pH and viscosity were made. It was found that the pH began to decline and that the viscosity went up as additional polymer was produced. The pH was again adjusted at the end of 89 hours. At the end of 96 hours, a viscosity of about 53 centipoises and a yield of 60 percent had been attained. The pH had declined at this point to 6.6. It was found that adjustment of the pH after 96 hours produced only a slight increase in the amount of heteropolysaccharide and that shortly thereafter the pH of the fermentate began to change toward the basic side, indicating that essentially all of the available carbohydrate in the media had been converted.

The data obtained in the test described above are set forth in Table I below and are shown in graphical form in FIGURE 2 of the drawing.

*Table I*

EFFECT OF pH CONTROL UPON FERMENTATION OF RAW SUGAR BY XANTHOMONAS ORGANISMS

| Elapsed Time, Hrs. | Fermentate, pH Initial | Fermentate, pH After Adjustment | Fermentate Viscosity,[1] Centipoises | Heteropolysaccharide Yield, Percent |
|---|---|---|---|---|
| 0 | 7.0 | | 1 | 0 |
| 25 | 6.8 | | 7.8 | |
| 41 | 6.1 | | 17.2 | |
| 48 | 6.1 | | 25.2 | 36.0 |
| 65 | 5.4 | | 22.8 | 36.0 |
| 70 | | 7.0 | | |
| 89 | 6.6 | 7.2 | 35 | |
| 96 | 6.6 | 7.2 | 53 | |
| 122 | 7.4 | | 55.5 | |
| 160 | 7.6 | | 72 | 60 |

[1] Viscosity values were determined at 80° F. with the Brookfield viscometer at 3 r.p.m. using the U. L. adapter and 1:6 dilution of the fermentate with distilled water.

Figure 2:
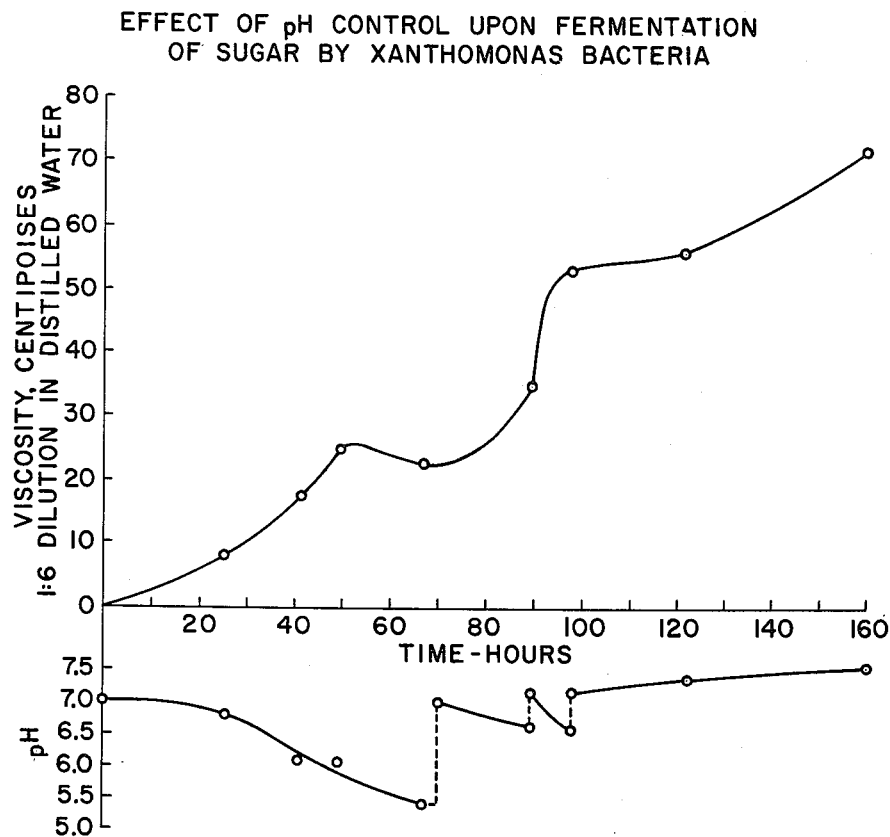
FIGURE 2 is a graph showing the effect of a change in pH upon the production of heteropolysaccharide in a process which had previously stopped far short of completion because of the production of acidic products.

From the above table and the accompanying FIGURE 2 it can be seen that the bacteria had ceased to produce heteropolysaccharide at the end of about 48 hours and that the fermentate viscosity obtained at that point was about 25.2 centipoises. The yield of heteropolysaccharide after 48 hours was only about 36 percent. During the time beginning at about 48 hours and ending at about 70 hours, the viscosity of the fermentate and the heteropolysaccharide yield steadily declined. Adjustment of the pH fermentate at the end of 70 hours not only prevented further reductions in viscosity and yield but also reactivated the bacteria so that considerably more heteropolysaccharide was produced than could otherwise have been obtained. The process of the invention thus provides a means for greatly increasing the efficiency with which carbohydrates are converted into heteropolysaccharide by the action of bacteria of the genus Xanthomonas. The increased heteropolysaccharide yields obtained permit a substantial reduction in the total cost of the heteropolysaccharide product.

Figure 3:
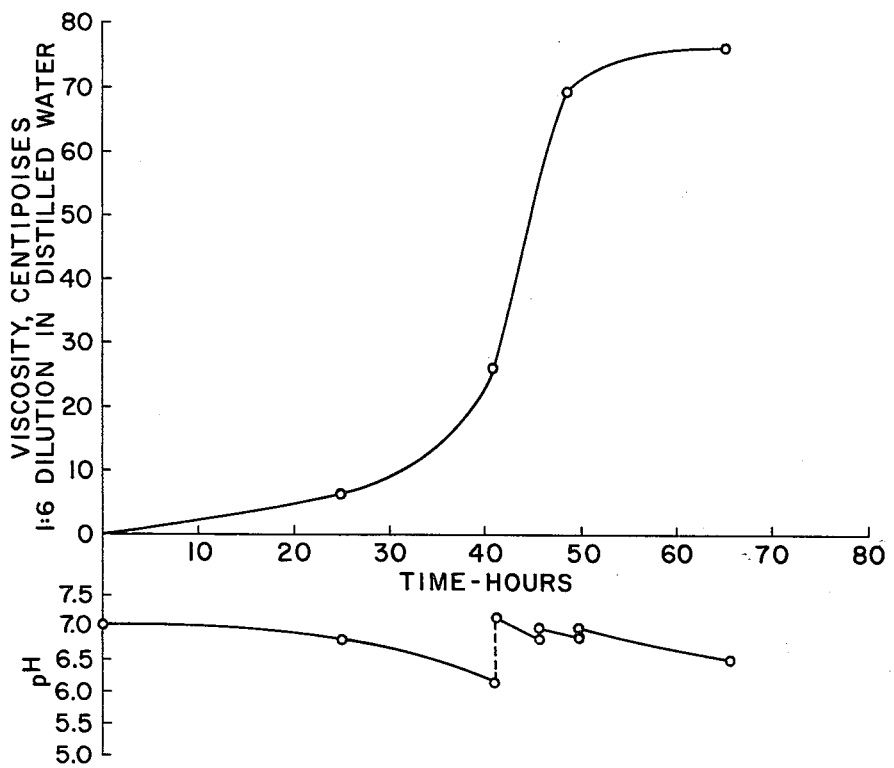
FIGURE 3 is a graph showing the effect of continual pH control upon the production of heteropolysaccharide by Xanthomonas organisms.

Following the test described above, a 6 liter fermentation in which the fermentate pH was controlled from the onset of the process was carried out. *Xanthomonas campestris* and a raw sugar solution identical to that employed in the earlier test were used. The pH, viscosity and heteropolysaccharide yield were determined at intervals and, following each determination, sufficient sodium hydroxide to raise the pH to 7.0 or higher was added. The results obtained are shown in Table II below and in FIGURE 3 of the drawing.

*Table II*

EFFECT OF CONTINUAL pH CONTROL UPON FERMENTATION OF RAW SUGAR BY XANTHOMONAS ORGANISMS

| Elapsed Time, Hrs. | Fermentate, pH Initial | Fermentate, pH After Adjustment | NaOH[1] Added, cc. | Fermentate Viscosity,[2] Centipoises | Heteropolysaccharide Yield, Percent |
|---|---|---|---|---|---|
| 0 | 7.0 | | | 1 | 0 |
| 25 | 6.8 | 7.0 | 1 | 6.8 | |
| 41 | 6.2 | 7.2 | 5 | 25.2 | 36 |
| 46 | 6.8 | 7.0 | 2 | | |
| 48 | | | | 68.4 | 49 |
| 49 | 6.9 | 7.0 | 2 | | |
| 65 | 6.5 | 7.6 | 6 | 76.0 | 76 |

[1] 5 N sodium hydroxide added to 6 liter solution.
[2] Viscosity values were determined at 80° F. with the Brookfield viscometer at 3 r.p.m. using the U.L. adapter and 1:6 dilution of the fermentate with distilled water.

The data presented in Table II and shown in FIGURE 3 of the drawing again demonstrate the advantages to be secured by controlling the fermentate pH during the fermentation of carbohydrates by Xanthomonas organisms. It will be noted that a yield of 76 percent was obtained after only 65 hours. In the earlier run where the pH was adjusted only after 70 hours had elapsed, the yield of heteropolysaccharide never reached this level, even though measurements were taken for a total of 160 hours. Continual control of the pH so that it is maintained in excess of about 6.5 thus permits greater yields of the heteropolysaccharide to be obtained and accelerates the formation of the polymer.

Examination of the heteropolysaccharide produced under controlled pH conditions and comparison of this with the material produced in the conventional manner where pH is not controlled have shown that the two products are identical so far as their thickening powers are concerned. Control of the pH to increase polymer yield and accelerate its formation therefore has no adverse affect upon the properties of the polymer obtained. It will be understod that the practice of the process described herein is not limited to the use of sodium hydroxide for adjusting the pH of the fermenting solution and that other basic materials, potassium hydroxide for example, may also be employed. The reduction in cost afforded by the process of the invention makes the heteropolysaccharide produced by bacterial fermentation of carbohydrates by Xanthomonas organisms particularly attractive as a water thickener for use in oil recovery processes and in other applications where a highly effective, inexpensive thickener is required.

What is claimed is:

1. An improved process for producing a water-soluble heteropolysaccharide which comprises inoculating an aqueous carbohydrate solution with bacteria of the genus Xanthomonas, fermenting said solution, adding a base to said solution during the fermentation to maintain the pH between about 6 and about 7.5, and recovering a viscous solution containing heteropolysaccharide.

2. A process as defined by claim 1 wherein said bacteria are of the species *Xanthomonas campestris*.

3. A process as defined by claim 1 wherein said bacteria are of the species *Xanthomonas begoniae*.

4. A process as defined by claim 1 wherein said carbohydrate solution is a sugar solution.

5. An improved process for producing a heteropolysaccharide which comprises inoculating an aqueous solution containing from about 1 to about 5 percent by weight of a carbohydrate with bacteria of the genus Xanthomonas, fermenting said solution under aerobic conditions until the pH of the solution drops below about 6, adding a base to said solution in a quantity sufficient to raise the pH to a value between about 6 and about 7.5, and thereafter continuing said fermentation to produce a viscous heteropolysaccharide solution.

6. A process as defined by claim 5 wherein said bacteria are of the species *Xanthomonas incanae*.

7. A process as defined by claim 5 wherein said aqueous solution is a raw sugar solution.

8. A process as defined by claim 5 wherein said base is sodium hydroxide.

9. An improved process for the production of a heteropolysaccharide by the action of bacteria of the genus Xanthomonas upon a carbohydrate which comprises preparing a sterile aqueous solution containing from about 1 percent to about 5 percent of said carbohydrate by weight, inoculating said solution with Xanthomonas organisms, fermenting said inoculated solution under aerobic conditions at a temperature between about 70° F. and about 100° F., repeatedly adding sodium hydroxide to said solution to maintain the pH between about 6 and about 7.5 during fermentation, and recovering a viscous solution containing heteropolysaccharide.

10. A process as defined by claim 9 wherein the pH of said solution is maintained between about 6.5 and about 7.2 during fermentation.

11. A process as defined by claim 9 wherein said solution is an unrefined sugar solution.

12. A process as defined by claim 9 wherein said organisms are of the species *Xanthomonas campestris*.

13. A process as defined by claim 9 wherein said solution is a starch solution.

References Cited in the file of this patent

Lockwood et al.: "Journal of Bacteriology," July 1941, page 54.

Prescott et al.: "Industrial Microbiology," 3rd ed., McGraw-Hill, publishers, 1959, page 505.